United States Patent
Magnouloux et al.

(10) Patent No.: US 10,455,982 B2
(45) Date of Patent: Oct. 29, 2019

(54) COOKING VESSEL COMPRISING A SENSOR SUPPORT

(71) Applicant: SEB S.A., Ecully (FR)

(72) Inventors: Guy Magnouloux, Epagny (FR); Michel Demolis, Lancrans (FR); Benoît Linglin, Saint Martin Bellevue (FR)

(73) Assignee: SEB S.A., Ecully (FR)

( * ) Notice: Subject to any disclaimer, the term of this patent is extended or adjusted under 35 U.S.C. 154(b) by 27 days.

(21) Appl. No.: 15/290,287

(22) Filed: Oct. 11, 2016

(65) Prior Publication Data
US 2017/0099990 A1 Apr. 13, 2017

(30) Foreign Application Priority Data
Oct. 12, 2015 (FR) ...................................... 15 59693

(51) Int. Cl.
| | | |
|---|---|---|
| A47J 37/10 | (2006.01) | |
| A47J 45/06 | (2006.01) | |
| A47J 36/00 | (2006.01) | |

(52) U.S. Cl.
CPC ............. *A47J 37/108* (2013.01); *A47J 36/00* (2013.01); *A47J 37/10* (2013.01); *A47J 45/068* (2013.01); *A47J 2202/00* (2013.01)

(58) Field of Classification Search
CPC ................................ A47J 36/00; A47J 37/108
USPC ................................... 99/342, 343, 344, 422
See application file for complete search history.

(56) References Cited

U.S. PATENT DOCUMENTS

| | | | | |
|---|---|---|---|---|
| 2,230,728 A * | 2/1941 | Propernick | .......... | A47J 37/0611 |
| | | | | 16/443 |
| 3,246,123 A * | 4/1966 | Ammerman | .......... | F24C 15/104 |
| | | | | 219/459.1 |
| 3,818,404 A * | 6/1974 | Senor | ..................... | H01H 81/02 |
| | | | | 200/293 |
| 5,441,344 A * | 8/1995 | Cook, III | ................ | A47J 43/28 |
| | | | | 374/141 |
| 5,556,468 A * | 9/1996 | Legrain | .............. | A45D 26/0014 |
| | | | | 118/202 |
| 6,571,606 B2 * | 6/2003 | Fleury | .................... | H01R 24/52 |
| | | | | 439/578 |

(Continued)

FOREIGN PATENT DOCUMENTS

| | | |
|---|---|---|
| DE | 20203556 U1 | 7/2002 |
| EP | 1745729 A1 | 1/2007 |
| WO | 2015/033060 A1 | 3/2015 |

*Primary Examiner* — Ibrahime A Abraham
*Assistant Examiner* — Frederick F Calvetti
(74) *Attorney, Agent, or Firm* — The Webb Law Firm

(57) ABSTRACT

Provided is a cooking vessel (1) including a body (2) equipped with a bottom (3) and a lateral wall (4), a handle (20) mounted to the body (2) by mounting means (6, 22), and a sensor (30) disposed in a receiving housing (11) near the bottom (3) and equipped with at least one electrically insulated conducting element (31, 32), said sensor (30) and said conducting element (31, 32) being mounted to a support (40) which extends from the bottom (3) along the lateral wall (4) and which is mounted to the handle (20). The support (40) includes a retaining part (42) for the sensor and the conducting element and at least one programmed deformation area (50, 55a, 55b) to allow mobility between the retaining part (42) for the sensor and the conducting element and the handle (20) in at least one direction.

13 Claims, 3 Drawing Sheets

(56) References Cited

U.S. PATENT DOCUMENTS

| | | | | |
|---|---|---|---|---|
| 6,942,383 B2* | 9/2005 | Kwon | .................... | A47J 45/068 |
| | | | | 374/141 |
| 7,157,675 B2* | 1/2007 | Imura | .................... | A47J 27/62 |
| | | | | 219/627 |
| 7,484,456 B2* | 2/2009 | Ferron | ................. | A47J 45/068 |
| | | | | 99/342 |
| 2007/0095215 A1* | 5/2007 | Ho | .......................... | A47J 37/10 |
| | | | | 99/342 |
| 2009/0088010 A1* | 4/2009 | Smith | ............... | H01R 13/5205 |
| | | | | 439/136 |
| 2011/0268153 A1* | 11/2011 | He | ...................... | A47J 37/108 |
| | | | | 374/179 |
| 2014/0182460 A1* | 7/2014 | Imura | .................... | A47J 27/62 |
| | | | | 99/342 |
| 2016/0121408 A1* | 5/2016 | Linglin | ................ | A47J 27/002 |
| | | | | 220/573.1 |
| 2016/0198882 A1* | 7/2016 | Linglin | .................. | A47J 36/02 |
| | | | | 220/573.3 |
| 2016/0316968 A1* | 11/2016 | Linglin | ................ | A47J 37/108 |

\* cited by examiner

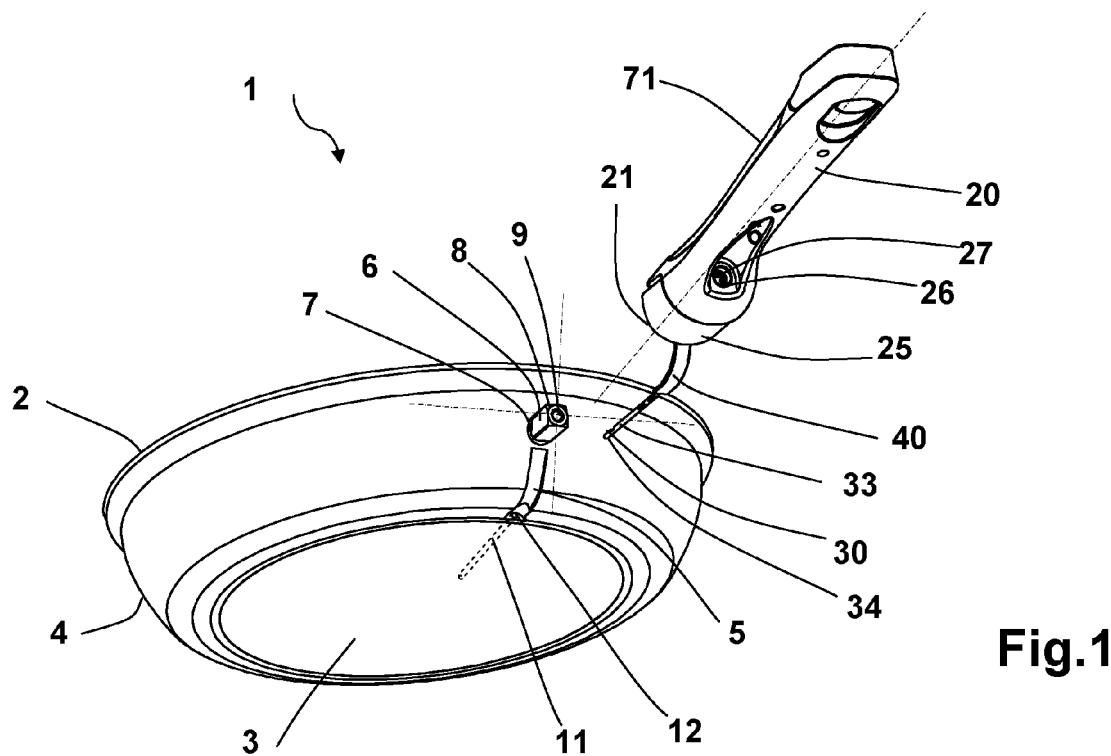
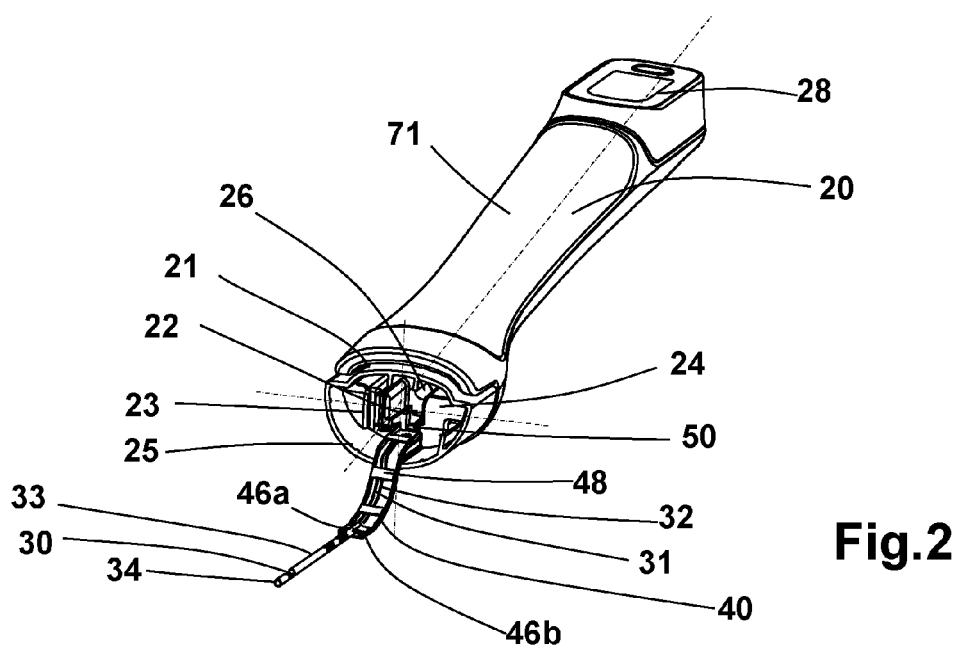
Fig.1
Fig.2

COOKING VESSEL COMPRISING A SENSOR SUPPORT

CROSS-REFERENCE TO RELATED APPLICATION

This application claims priority to French Patent Application No. 1559693 filed Oct. 12, 2015, the disclosure of which is hereby incorporated in its entirety by reference.

FIELD OF INVENTION

The present invention relates to a cooking vessel made to be placed on a cooktop, burner or the like for cooking food, for example a skillet, saucepan, stockpot, or pressure cooker, more particularly a cooking vessel equipped with a body comprising a sensor, particularly a temperature sensor.

DESCRIPTION OF RELATED ART

There is a cooking vessel known from the document DE20203556 comprising a body equipped with a bottom and a lateral wall, a handle mounted to the body by mounting means and a sensor disposed in a housing near the bottom and equipped with two electrically insulated conducting elements. The mounting means comprise a part disposed on the body and a part on the handle. The sensor and the conducting elements are mounted to a support that extends from the bottom, along the lateral wall. The support is rigidly mounted to the handle.

Thus, the handle equipped with its part of the mounting means and the support equipped with the sensor form a subassembly that can be produced independently from the rest of the cooking vessel. In this subassembly, the position between the sensor and the part of the mounting means can vary around a theoretical value and can have a minimum value or a maximum value, depending on the manufacturing tolerances. The body equipped with its part of the mounting means for the handle and the receiving housing for the sensor also forms a subassembly. The position between the receiving housing for the sensor and the part of the mounting means disposed on the body can also vary around a theoretical value and can have a minimum value or a maximum value, depending on the manufacturing tolerances.

During the final mounting of the handle subassembly onto the body subassembly, the sensor is positioned so as to be tightly fitted into its housing, and the handle part of the mounting means is also mounted so as to be tightly fitted into the body part of the mounting means. In the case where, for example, the position between the sensor and the handle part of the mounting means has a value close to the minimum value, and conversely, when the position between the receiving housing for the sensor and the part of the mounting means has a value close to the maximum value, stresses will appear in the support and the sensor, particularly in the area where the support is mounted on the handle, given that the mounting of the handle to the body is solid and tightly fitted.

Furthermore, in operation, the expansion differentials of the body and the support will also generate stresses in both the support and the sensor.

Thus, in use, these stresses can impair the operation of the sensor, damage the conducting elements, or break the support. Consequently, the cooking vessel may no longer have the functionalities provided by the sensor.

The object of the present invention is to overcome the aforementioned disadvantages and to propose a cooking vessel equipped with a sensor that offers reliable, repeatable, and long-lasting operation.

Another object of the invention is to propose a cooking vessel equipped with a sensor that is simple in design and economical to use.

SUMMARY OF THE INVENTION

These objects are achieved with a cooking vessel comprising a body equipped with a bottom and a lateral wall, a handle mounted to the body by mounting means, and a sensor disposed in a receiving housing near the bottom and equipped with at least one electrically insulated conducting element, said sensor and said conducting element being mounted to a support which extends from the bottom along the lateral wall and which is mounted to the handle, characterized in that the support includes a retaining part for the sensor and the conducting element and at least one programmed deformation area to allow mobility in at least one direction between the retaining part for the sensor and the conducting element and the handle.

Thus the handle equipped with a part of the mounting means, the sensor, and the support advantageously forms a first subassembly, and the body equipped with a part of the handle-mounting means and the housing for the sensor forms a second subassembly.

During the assembly of the two subassemblies, the programmed deformation area makes it possible to accommodate the position tolerances between the housing for the sensor and the part of the handle-mounting means disposed on the body of the first subassembly and between the part of the handle-mounting means and the sensor of the second subassembly.

The term programmed deformation area is understood to mean an area capable of being deformed, preferably in front of the retaining part for the sensor and the conducting element. The dimensions and the material of the deformation area are chosen so as to make it possible to obtain a deformation amplitude that is compatible with the position tolerances between the housing for the sensor and the part of the handle-mounting means disposed on the body of the second subassembly and the position tolerances between the sensor and the part of the handle-mounting means of the first subassembly, without generating harmful stresses on sensitive components like the sensor.

Advantageously, the programmed deformation area is deformed elastically. Thus, the programmed deformation area can return to its original shape after having been deformed.

Preferably, the support includes a programmed deformation area that is S-shaped.

The S shape is connected by a first end to the retaining part for the sensor and the conducting element and by a second end to a mounting part for the support which is connected to the handle. The neutral axis of the S shape is elongated, particularly relative to the neutral axis of a straight shape, in order to allow greater mobility.

Thus, this arrangement makes it possible to obtain mobility between the retaining part for the sensor and the conducting element and the handle, particularly in a direction perpendicular to the plane in which the S shape is located.

Advantageously, the S shape has a cross section S1 and the retaining part for the sensor and the conducting element has a cross section S2, S1 being less than one third of S2.

This cross-sectional ratio makes it possible to obtain a rigid retaining part for the sensor and the conducting element and a deformable S shape which constitutes the programmed deformation area.

Advantageously, the support comprises a mounting part disposed in a receptacle of the handle and the support comprises a programmed deformation area formed by two flexible tongues disposed opposite each other on the mounting part, which cooperate with two support surfaces of the receptacle of the handle.

The flexible tongues allow the mounting part of the support to move inside its receptacle. This arrangement makes it possible to obtain mobility between the retaining part for the sensor and the conducting element and the handle.

Advantageously, the two flexible tongues include two angular free ends which form reverse locking means of the harpoon type once the mounting part is inserted into the receptacle.

This arrangement makes it possible to fulfill a function for retaining the support inside the handle without adding any additional parts, which is particularly economical.

Preferably, the support is made of a metal material, particularly an austenitic non-ferromagnetic stainless steel.

The support made of a metal material is adapted to withstand high temperatures, particularly in proximity to the bottom of the body. A support made of austenitic non-ferromagnetic stainless steel makes it possible, when the cooking vessel is used with an induction heating means, to obtain a support that does not couple with the induction heating means.

Advantageously, the retaining part for the sensor and the conducting element has a substantially constant cross section, particularly in the shape of a flattened U.

This arrangement makes it possible to produce the support economically, particularly from a metal strip that is stamped to form a U shape.

Advantageously, the support includes tabs for retaining the conducting element.

Preferably, the sensor and a part of the conducting element are encapsulated in a tubular metal sheath, and the support includes two mounting tabs for the tubular sheath, the two mounting tabs having a spring effect for retaining the tubular sheath on the support.

These arrangements make it possible, particularly when the support is made from a metal strip that is cut out and then shaped by stamping, to provide the tabs directly in the cutout, thus avoiding having to add any parts in order to fulfill the function of retaining the conducting element and mounting the tubular sheath of the sensor.

Thus, the support equipped with tabs for retaining the conducting element and tabs for retaining the tubular element of the sensor is composed of a single piece.

Advantageously, the lateral wall includes a groove and the retaining part for the sensor and the conducting element is disposed in the groove.

This arrangement makes it possible to integrate the support into the body so as not to have any protruding parts, thus facilitating cleaning and improving the esthetics.

Preferably, the means for mounting the handle on the body comprise a lug welded to the body, said lug cooperating with a housing inside the handle.

Advantageously, the sensor is a temperature sensor, particularly an NTC or a thermocouple.

NTC is understood to mean Negative Temperature Coefficient thermistor.

Preferably, the cookware item is a skillet, saucepan, stockpot, or pressure cooker.

BRIEF DESCRIPTION OF THE DRAWINGS

The invention will be better understood by reviewing the embodiments used as nonlimiting examples and illustrated in the attached figures, in which:

FIG. 1 illustrates an exploded perspective view of a cooking vessel according to a particular embodiment of the invention.

FIG. 2 illustrates a perspective view of the handle subassembly of the cooking vessel of FIG. 1.

DETAILED DESCRIPTION OF THE INVENTION

Figure 3:
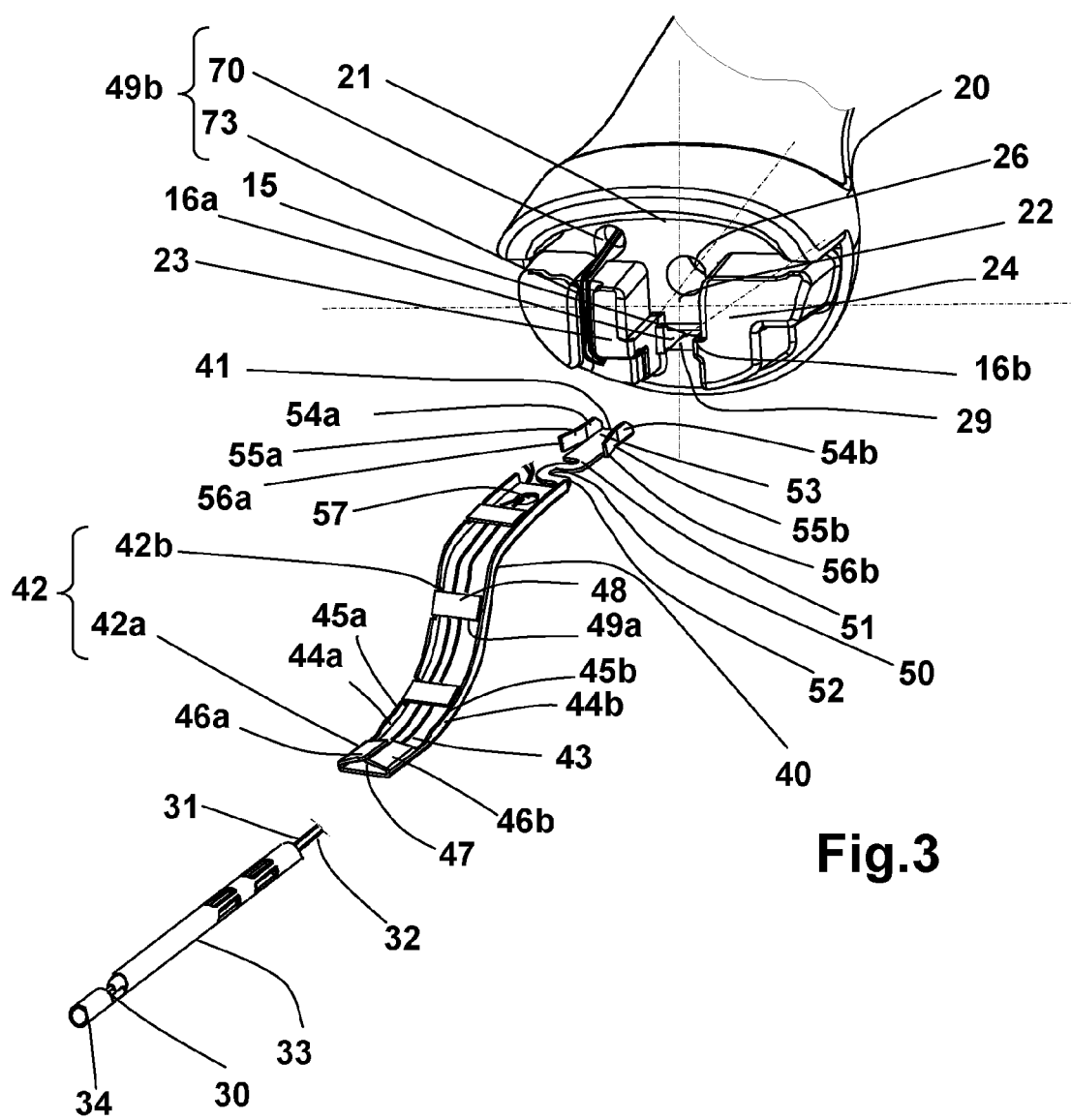
FIG. 3 illustrates a detailed exploded perspective view of the handle subassembly of FIG. 2.

It should be noted that in this document, the terms "horizontal," "vertical," "lower," "upper," "longitudinal," "transverse," "top," and "bottom" used to describe the cooking vessel refer to this cooking vessel during use, when it is positioned in a horizontal plane.

As may be seen in FIGS. 1 and 2, a cooking vessel 1 comprises a body 2 comprising a bottom 3 and a lateral wall 4. The body 2 is made of aluminum, for example by the stamping of a blank or by a casting operation. The bottom 3 has a thickness inside which is disposed a receiving housing 11 for a sensor 30. The receiving housing 11 forms a tunnel which includes an opening 12 in the lateral wall 4 and which extends radially from this opening 12 toward the center of the bottom 3.

The cooking vessel 1 comprises a handle 20 which extends radially to the body 2 in a longitudinal direction. The handle 20 is disposed on the lateral wall 4 of the body 2 by mounting means 6, 22. The body 2 includes a part of the mounting means formed by a welded lug 6. The lug 6 has the overall shape of a rectangular parallelepiped, which has a first end 7 adapted to be mounted to the body 2, and a second end 8 comprising a threaded blind hole 9.

The handle 20 comprises an end 21 equipped with a part of the mounting means which is formed by a receiving housing 22 for the lug 6. The end 21 of the handle 20 includes two protuberances 23, 24 and a collar 25 surrounding the two protuberances 23, 24 which form the receiving housing for the lug 6. The end 21 of the handle 20 comprises a flanged through hole 26, formed in the extension of the housing 22. The hole 26 is made to receive a screw 27 capable of cooperating with the threaded blind hole 9 of the lug 6.

As may be seen in FIG. 3, the temperature sensor 30 can be formed by an NTC thermistor or a thermocouple. NTC is understood to mean Negative Temperature Coefficient. The temperature sensor 30 is equipped with two insulated conducting elements 31, 32, which are disposed in a tubular stainless steel sheath 33, sealed at one end 34. The temperature sensor 30 is positioned at the bottom of the tubular sheath 33, near the sealed end 34. The tubular sheath 33 is adapted to be completely inserted into the receiving housing 11 so that the sensor 30 is maintained in a tightly fitted position, practically without play. The conducting elements 31, 32 are electrically connected to a control circuit 28 (FIG. 2) capable of processing the amplitude measured by the temperature sensor. The control circuit 28 is disposed in the handle 20 and can include, for example processing and display means and/or means for communicating with a heating means.

According to FIG. 3, the cooking vessel 1 comprises a support 40 comprising, at a first end, a mounting part 41 capable of cooperating with a receptacle 29 disposed at the end 21 of the handle 20. The receptacle 29 has a parallelepiped shape and includes a rectangular opening 15. The receptacle 29 is disposed below the housing 22 for receiving the lug 6. The support 40 includes a retaining part 42 for the tubular sheath and the conducting elements. The retaining part 42 comprises a part 42a for retaining the tubular sheath 33 and a part 42b for retaining the conducting elements 31, 32. The retaining part 42a is disposed at a second end of the support 40.

The support 40 is made from a metal strip that is cut out and then shaped by stamping. The retaining part 42 for the tubular sheath and the conducting elements has a substantially constant cross section in the shape of a flattened U. The cross section has a flat surface 43 and two lateral edges 44a, 44b, each comprising a free end 45a, 45b.

The retaining part 42a for the tubular sheath 33 includes two tabs 46a, 46b, which extend from the two free ends 45a, 45b of the lateral edges 44a, 44b above the flat surface 43 so as to form a receiving housing 47 for the tubular sheath 33. The two mounting tabs 46a, 46b have a spring effect for retaining the tubular sheath 33 on the flat surface 43 of the support 40.

The retaining part 42b for the conducting elements 31, 32 includes tabs 48 that extend from the free end 45a of the lateral edge 44a above the flat surface 43 so as to form a part 49a of an area 49 for receiving the conducting elements 31, 32.

The support 40 includes a programmed deformation area 50 that is S-shaped. The S shape is connected by a first end 51 to the retaining part 42 for the tubular sheath and the conducting elements and by a second end 52 to the mounting part 41 of the support 40 that is connected to the handle 20. The S shape has a rectangular cross section.

Thus, the retaining part 42 for the tubular sheath and the conducting elements is movable relative to the handle 20, particularly in a substantially vertical direction, perpendicular to the plane in which the S shape is located.

The mounting part 41 of the support 40 has a flattened U-shaped cross section which comprises a flat surface 53 and two lateral edges 54a, 54b. The flattened U-shaped part of the mounting part 41 is dimensioned for being inserted into the receptacle 29 of the handle 20. Two flexible tongues 55a, 55b extend longitudinally from the two lateral edges 54a, 54b, toward the outside of the U. The support 40 includes a programmed deformation area formed by the flexible tongues 55a, 55b disposed opposite each other on the mounting part 41. The flexible tongues 55a, 55b have two free ends 56a, 56b, which cooperate with two opposing support surfaces 16a, 16b of the receptacle 29 of the handle 20. The flat surface 53 of the flattened U is located in the plane in which the S shape is located.

The mounting part 41 of the support 40 can move inside its receptacle 29 transversely to the longitudinal direction, in a substantially horizontal direction. Thus, the retaining part 42 for the tubular sheath and the conducting elements is movable relative to the handle 20 in a horizontal direction, perpendicular to the vertical direction.

The support 40 includes, in the flat surface 43, a perforation 57. The perforation 57 is disposed at the end of the retaining part 42b for the conducting elements 31, 32, near the programmed deformation area 50. The conducting elements 31, 32 are positioned in the perforation 57 so as to pass from the part 49a to a part 49b of the receiving area 49 for the conducting elements 31, 32.

The lateral wall 4 includes a groove 5 (FIG. 1) extending from the opening 12 of the receiving housing 11 for the sensor 30 to the top of the lateral wall 4 just under the lug 6. The groove 5 is for receiving the support 40 once the tubular sheath 33 is inserted into the receiving housing 11.

Figure 4:
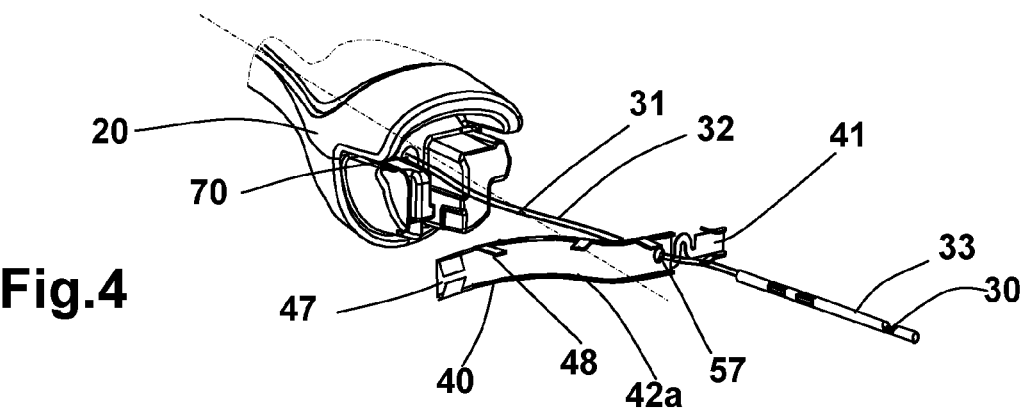
FIG. 4 illustrates a perspective view of the support, which is in an intermediate mounting position of the method for forming the handle subassembly of FIG. 2.

As may be seen in FIGS. 3 and 4, the conducting elements 31, 32 are disposed in the support 40 in the part 49a of the receiving area 49 and in the handle 20 in the part 49b of the receiving area 49 for the conducting elements 31, 32. The part 49b includes, at the end 21, a conduit 70 (FIG. 3) and a guide channel 73 for the conducting elements, disposed alongside the protuberance 23.

Figure 5:
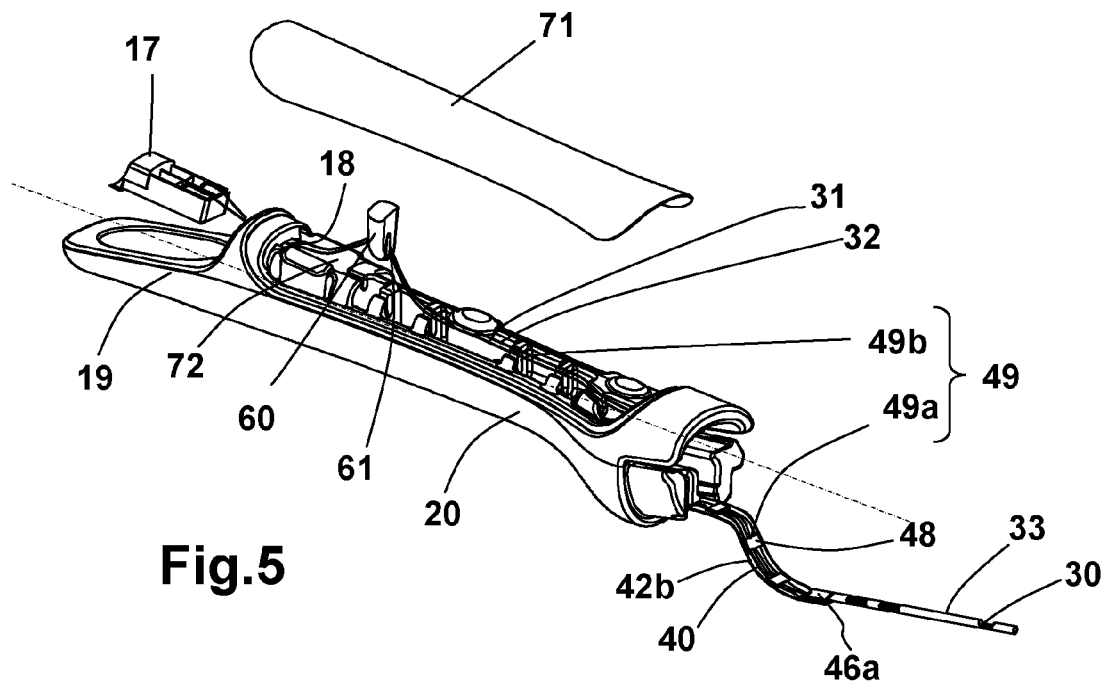
FIG. 5 illustrates an exploded perspective view of the handle subassembly of FIG. 2.
Figure 6:
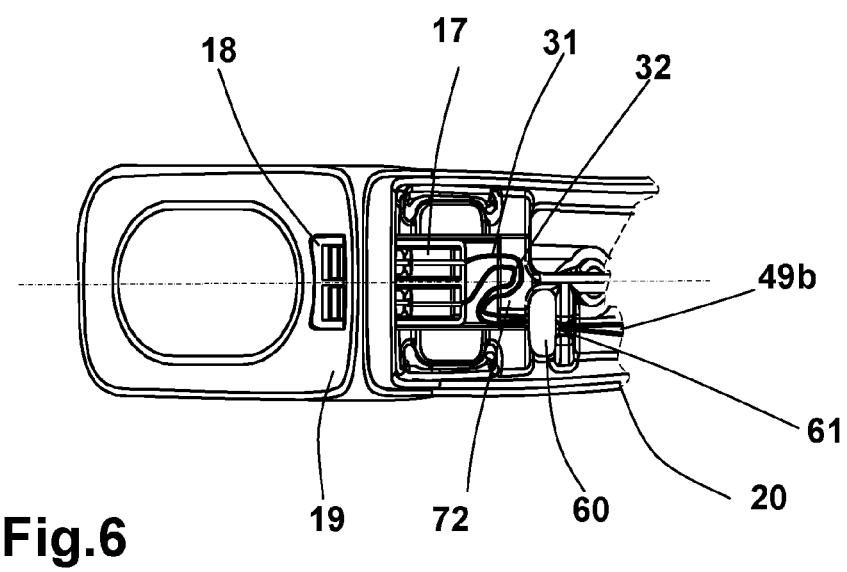
FIG. 6 illustrates a detailed top view of the free end of the handle without the cover of the handle subassembly of FIG. 2.

According to FIGS. 5 and 6, a braking device 60 for the conducting elements 31, 32 is disposed in the handle 20. The braking device is formed by a silicone stop 60 that has a slot 61. The conducting elements 31, 32 are positioned inside the slot 61, which is oriented in the longitudinal direction. The conducting elements 31, 32 are connected to a connector 17 of the control circuit 28. The handle 20 has a free end 19 equipped with an opening 18 which extends in the longitudinal direction. The connector 17 is disposed in the opening 18. The handle 20 comprises a receiving housing 72 for a residual part of the conducting elements 31, 32, which form at least one loop. The receiving housing 72 is disposed between the silicone stop 60 and the connector 17. The opening 18 opens into the receiving housing 72.

A cover 71 is mounted on the handle 20. The cover 71 covers the part 49b of the receiving area 49 for the conducting elements 31, 32, the receiving housing 72 of the residual part of the conducting elements 31, 32, and the silicone stop 60.

The cooking vessel 1 comprises two subassemblies, which can be produced independently and joined in a final assembly operation. A first subassembly, called the handle subassembly, is formed by the handle 20 equipped with the receiving housing 22 for the lug 6, the support 40, the conducting elements 31, 32, and the sensor 30 equipped with its tubular sheath 33. A second subassembly called the body subassembly is formed by the body 2 equipped with the lug 6, the receiving housing 11 for the sensor 30, and the groove 5.

The method for assembling the handle subassembly comprises the following steps:

Mounting the sensor 30 equipped with the conducting elements 31, 32 inside the tubular sheath 33 and connecting the conducting elements 31, 32 to the connector 17;

Feeding the tubular sheath 33 into the opening 18 at the free end 19 of the handle 20, then feeding the tubular sheath 33 into the conduit 70;

Inserting the conducting elements 31, 32 into the slot 61 of the silicone stop 60, then positioning the silicone stop 60 inside the handle 20;

Pre-positioning the conducting elements 31, 32 in the part 49b of the receiving area 49 and in the receiving housing 72, a part of the conducting elements 31, 32 and the connector 17 extending beyond the opening 18 and a part of the conducting elements 31, 32 and the tubular sheath extending beyond the conduit 70, then mounting the cover 71 on the handle 20, particularly by gluing.

At this stage of the assembly, a standard handle pre-subassembly for a family of cooking vessels may be considered to have been produced.

To finish the handle subassembly, the assembly method comprises the following steps:

- feeding the tubular sheath through the perforation 57 of the support 40 (FIG. 4) and inserting the mounting part 41 into the receptacle 29 of the handle 20;
- forcibly inserting the tubular sheath 33 into the receiving housing 47 so as to mount the sensor 30 on the support 40;
- arranging the conducting elements 31, 32 in the retaining part 42b and folding the tabs 48 to form the part 49a of the receiving area 49;
- tensioning the conducting elements 31, 32 inside the receiving area 49 by exerting traction on the connector 17 and/or on the conducting elements 31, 32, the braking device formed by the stop 60 allowing the conducting elements to move in the direction of the traction, the receiving area 49 being formed by the part 49b in the handle 20 and by the part 49a in the support 40;
- inserting the connector 17 into the opening 18 and the residual part of the conducting elements 31, 32 into the receiving housing 72 of the handle 20, the residual part of the conducting elements 31, 32 forming at least one loop, the braking device then preventing the conducting elements 31, 32 from moving in the direction opposite the direction of the traction during the formation of the loop.

During the final assembly operation, the housing 22 of the handle 20 is mounted so as to be tightly fitted onto the lug 6 and the tubular sheath 33 is inserted so as to be tightly fitted into the receiving housing 11. During this operation, the programmed deformation areas 50, 55a, 55b make it possible to accommodate the dimensional tolerances of the two subassemblies.

Of course, the invention is not in any way limited to the embodiments described and illustrated, which have been given only as examples. Modifications are still possible, particularly from the point of view of the composition of the various elements or the substitution of technical equivalents, without going beyond the scope of protection of the invention.

Thus, in a variant of embodiment, the S shape of the programmed deformation area of the support can have another shape, for example one or more straight shapes extending parallel to each other between the mounting part and the retaining part for the sensor and the conducting element.

The invention claimed is:

1. A cooking vessel (1) comprising a body (2) equipped with a bottom (3) and a lateral wall (4), a handle (20) mounted to the body (2) by mounting means (6, 22), and a sensor (30) disposed in a receiving housing (11) near the bottom (3) and equipped with at least one electrically insulated conducting element (31, 32), said sensor (30) and said conducting element (31, 32) being mounted to a support (40) which extends from the bottom (3) along the lateral wall (4) and which is mounted to the handle (20), wherein the support (40) includes a retaining part (42) for the sensor and the conducting element and at least one programmed deformation area (50, 55a, 55b) to allow mobility between the retaining part (42) for the sensor and the conducting element and the handle (20) in at least one direction, wherein the handle comprises: (i) a flanged through hole formed longitudinally through an extension of a housing of the handle; and (ii) a receptacle disposed below the housing at an end of the handle and which receives a mounting part of the support, and wherein the support includes a programmed deformation area that is S-shaped, the S-shape comprising: a first end connected to the retaining part for the sensor and the conducting element; a second end connected to the mounting part of the support which is connected to the handle; and a neutral axis that is elongated relative to a neutral axis of a straight shape to allow greater mobility.

2. The cooking vessel (1) according to claim 1, wherein the support (40) comprises the mounting part (41) disposed in the receptacle (29) of the handle (20) and in that the support (40) includes a programmed deformation area formed by two flexible tongues (55a, 55b) disposed opposite each other on the mounting part (41), which cooperate with two support surfaces (16a, 16b) of the receptacle (29) of the handle (20).

3. The cooking vessel (1) according to claim 2, wherein the two flexible tongues (55a, 55b) include two angular free ends (56a, 56b) which form reverse locking means once the mounting part (41) is inserted into the receptacle.

4. The cooking vessel (1) according to claim 1, wherein the support (40) is made of a metal material.

5. The cooking vessel (1) according to claim 1, wherein the retaining part (42) for the sensor and the conducting element has a substantially constant cross section, in the shape of a flattened U comprising a flat surface and two lateral edges.

6. The cooking vessel (1) according to claim 1, wherein the support (40) includes tabs (48) for retaining the conducting element (31, 32).

7. The cooking vessel (1) according to claim 1, wherein the sensor (30) and a part of the conducting element (31, 32) are encapsulated in a tubular metal sheath (33), and in that the support (40) includes two mounting tabs (46a, 46b) for the tubular sheath (33), the two mounting tabs (46a, 46b) retain the tubular sheath (33) on the support (40).

8. The cooking vessel (1) according to claim 1, wherein the lateral wall (4) includes a groove (5) and wherein the retaining part (42) for the sensor and the conducting element is disposed in the groove (5).

9. The cooking vessel (1) according to claim 1, wherein the means for mounting the handle on the body comprise a lug (6) welded to the body, said lug (6) cooperating with the housing (22) inside the handle (20).

10. The cooking vessel (1) according to claim 1, wherein the sensor (30) is a temperature sensor.

11. The cooking vessel (1) according to claim 1, wherein the cookware item is one of a skillet, saucepan, stockpot, or pressure cooker.

12. The cooking vessel (1) of claim 4, wherein the metal material of the support (40) is an austenitic non-ferromagnetic stainless steel.

13. The cooking vessel (1) of claim 10, wherein the temperature sensor is one of a NTC thermistor or a thermocouple.

* * * * *

UNITED STATES PATENT AND TRADEMARK OFFICE
CERTIFICATE OF CORRECTION

PATENT NO. : 10,455,982 B2
APPLICATION NO. : 15/290287
DATED : October 29, 2019
INVENTOR(S) : Guy Magnouloux et al.

It is certified that error appears in the above-identified patent and that said Letters Patent is hereby corrected as shown below:

In the Claims

Column 7, Line 60, Claim 1, after "area" delete "(50, 55a, 55b)"

Signed and Sealed this
Eighteenth Day of February, 2020

Andrei Iancu
*Director of the United States Patent and Trademark Office*